United States Patent

Okuya et al.

[11] Patent Number: 4,751,277
[45] Date of Patent: Jun. 14, 1988

[54] AMINO GROUP-CONTAINING DIENE COPOLYMER

[75] Inventors: Eitaro Okuya, Mie; Hiroji Enyo, Suzuka; Shin-ichiro Iwanama, Yokkaichi, all of Japan

[73] Assignee: Japan Synthetic Rubber Co., Ltd., Tokyo, Japan

[21] Appl. No.: 525,668

[22] Filed: Aug. 23, 1983

[30] Foreign Application Priority Data

Aug. 31, 1982 [JP] Japan .................. 57-151542

[51] Int. Cl.⁴ ........................... C08F 226/00
[52] U.S. Cl. ................................. 526/312
[58] Field of Search ....................... 526/312

[56] References Cited

U.S. PATENT DOCUMENTS 3,904,580 9/1975 Lasis et al. .................. 524/533
4,052,542 10/1977 Wei et al. .................... 526/312

Primary Examiner—Joseph L. Schofer
Assistant Examiner—Peter F. Kulkosky
Attorney, Agent, or Firm—Oblon, Fisher, Spivak, McClelland & Maier

[57] ABSTRACT zs An amino group-containing copolymer which is composed of (A) butadiene, isoprene or both of them, (B) acrylonitrile and (C) a (meth)acrylate represented by the general formula (I):

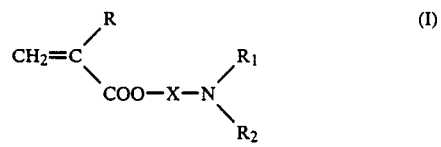

wherein R is H or $CH_3$, $R_1$ and $R_2$ are independently alkyl groups having 2 to 8 carbon atoms, and X is an alkylene group having 2 to 4 carbon atoms, and has a polymer composition (weight %) of (A):(B):(C) of 30 to 89.9:10 to 50:0.1 to 20. Said multi-component copolymer is used as oil-resistant rubber, and is particularly excellent in resistance to growth of crack by solvent.

10 Claims, 1 Drawing Sheet

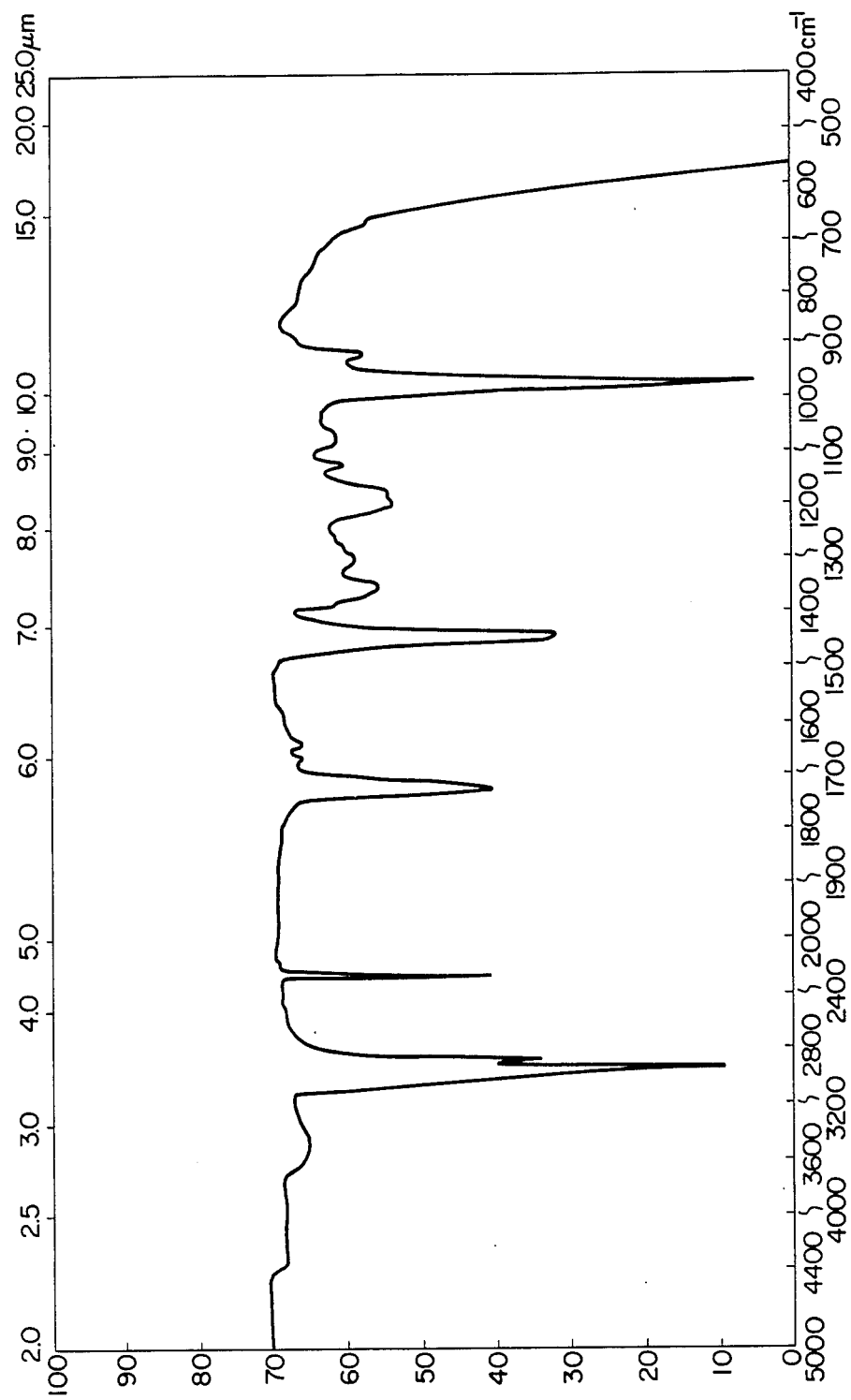

AMINO GROUP-CONTAINING DIENE COPOLYMER

BACKGROUND OF THE INVENTION

1. Field of the Invention

This invention relates to a novel amino group-containing diene copolymer. More particularly, it relates to an improvement in the resistance to growth of crack by solvent of an oil-resistant rubber typified by acrylonitrile-butadiene rubber (NBR).

2. Description of the Prior Art

In recent years, lead-free gasoline has been practically used as a countermeasure of the public pollution caused by lead in gas exhausted from cars. As a result, the amount of the aromatic component added to gasoline has been increased in order to improve the octane value. With an increase of the aromatic component content in gasoline, even concerning the oil-resistant performance of the rubber parts in a fuel system, the resistance to growth of crack by solvent has come to be required as a property important in practical use, in addition to performances such as low volume change, low decrease of strength, low decrease of elongation and the like after immersion, which have hitherto been required.

Hitherto, from the results of research on the effects of crosslinked structure of the vulcanized NBR, kinds and amounts of fillers and the like on the resistance to growth of crack by solvent of the vulcanized NBR in various kinds of solvents, it has been found that the resistance to growth of crack by solvent is not sufficiently imparted for practical use by only modifying the combination of ingredients and it has been considered that the improvement of the polymer itself is necessary. For this purpose, it has already been found that an effect is obtained by allowing the molecular weight distribution to have a peak on its low molecular weight side too, namely, have a double-peak-distribution, and by forming a blend of NBR with PVC.

SUMMARY OF THE INVENTION

As a result of extensive research on improvement of the resistance to growth of crack by solvent from the aspect of polymer structure, the present inventors have found that a multi-component copolymer formed by introducing into a conjugated diene-acrylonitrile copolymer a specific tertiary amino group-containing acrylate as the third monomer of the copolymer has improved resistance to oil and fuel oil particularly improved resistance to growth of crack by solvent and to swelling in a high aromatic solvent which maintaining the tensile strength, elongation, cold-resistance and other physical properties of the conjugated diene-acrylonitrile copolymer.

According to this invention, there is provided a novel amino group-containing diene copolymer comprising as the monomer units constituting the copolymer (A) 30 to 89.9 weight percent of butadiene, isoprene or both of them, (B) 10 to 50 weight percent of acrylonitrile and (C) 3.7 to 20 weight percent of a (meth)acrylate represented by the general formula (I):

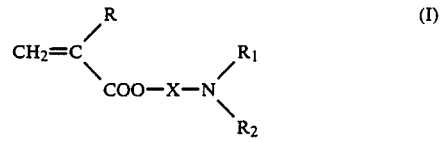

wherein R is H or $CH_3$, $R_1$ and $R_2$ are independently alkyl groups having 2 to 8 carbon atoms, and X is an alkylene group having 2 to 4 carbon atoms.

BRIEF DESCRIPTION OF DRAWINGS

FIG. 1 shows an infrared absorption spectrum of polymer A obtained in Examples 1 to 4.

DETAILED DESCRIPTION OF THE INVENTION

The amount of the bound butadiene and/or isoprene in the copolymer of this invention is 30 to 89.9 weight %, preferably 50 to 80 weight %. When it is less than 30 weight %, the cold resistance deteriorates greatly, while when it exceeds 89.9 weight %, sufficient oil-resistance cannot be obtained. The content of the bound acrylonitrile is 10 to 50 weight %, preferably 20 to 45 weight %. When it is less than 10 weight %, sufficient oil-resistance cannot be obtained, while when it exceeds 50 weight %, the cold resistance deteriorates greatly and the properties as an elastomer are imparied.

The (meth)acrylate of the constituent (C) of this invention is represented by the general formula (I):

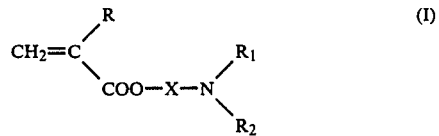

wherein R, $R_1$, $R_2$ and X have the same meanings as defined above, and R is preferably $CH_3$, and $R_1$ and $R_2$ are preferably alkyl groups having 2 to 4 carbon atoms.

When $R_1$ and $R_2$ in the (meth)acrylate of the general formula (I) are methyl groups, the resistance to growth of crack by solvent is improved but the other physical properties are not satisfactory, and particularly, the permanent compression set becomes great, so that it is undesirable from the viewpoint of physical properties of rubber. When hydrocarbon groups having 9 or more carbon atoms are used as the $R_1$ and $R_2$, the improvement effect on the resistance to growth of crack by solvent is small, though no serious problems occur concerning physical properties of rubber.

The content of the bound (meth)acrylate (C) is 3.7 to 20 weight %, preferably 3.7 to 15 weight %. If the contnet is too small, the improvement effect on the resistance to growth of crack by solvent is small, while if the content exceeds 20 weight %, inconveniences appear in physical properties of rubber.

As the (meth)acrylate of the general formula (I), there may be used specifically diethylaminoethyl acrylate, diethylaminoethyl methacrylate, dibutylaminoethyl methacrylate, dibutylaminopropyl methacrylate, diethylaminobutyl methacrylate, dihexylaminoethyl methacrylate, dioctylaminoethyl methacrylate or the like.

The copolymer of this invention can easily be obtained by a usual emulsion polymerization process. As a polymerization initiator, there may be used a usual radical initiator such as a peroxide, a redox system catalyst, a persulfate or an azo compound. As an emulsifier, there may be used any of anionic, cationic, nonionic and amphoteric surfactants, or mixtures thereof. As a molecular weight modifier, there may be used mercaptans such as tertiary dodecyl mercaptan, normal dodecyl mercaptan and the like. The polymerization is conducted at a temperature of 0° to 50° C. in a reactor from which oxygen has been removed. The monomers, emulsifier, molecular weight modifier, initiator and other additives for polymerization may be added either in their whole amounts to the reaction system before the initiation of the reaction, or in portions after initiation of the reaction. Operation conditions such as temperature, stirring conditions and the like may be properly changed in the course of the reaction. The polymerization may be conducted either continuously or batchwise.

Although the molecular weight of the copolymer of this invention can be varied in a wide range, the Mooney viscosity $ML_{1+4}$ (100° C.) is usually in a range of 20 to 120, preferably in a range of 30 to 80. The copolymer of this invention is provided for practial use after compounded with usually used compounding agents such as fillers, anti-aging agents, plasticizers, stabilizers and the like. As the method of kneading with these compounding agents, there may be used various methods such as a usual roll kneading method, a kneading method by means of a closed type Banbury mixer, and the like. The compound may be molded and vulcanized in a usual way. That is to say, the compound may be either subjected to usual press-vulcanization or molded by means of an extruder and then vulcanized. The thus obtained vulcanizate is very excellent in resistance to growth of crack by solvent and resistance to swelling as compared with a conventional NBR or the like.

DESCRIPTION OF PREFERRED EMBODIMENTS

This invention is explained in more detail below referring to Examples. In Examples and Comparative Examples, parts and % are by weight unless otherwise specified.

EXAMPLES 1 TO 4 AND COMPARATIVE EXAMPLE 1

(Production of Copolymer)

Polymerization was conducted in an autoclave having a capacity of 20 liters by using the monomers and additives for polymerization mentioned below.

| | | |
|---|---|---|
| Butadiene | 43 | parts |
| Acrylonitrile | 47 | parts |
| Diethylaminoethyl methacrylate | 10 | parts |
| Water | 220 | parts |
| Sodium dodecylbenzenesulfonate | 4 | parts |
| t-Dodecyl mercaptan | 0.55 | part |
| Potassium persulfate | 0.27 | part |
| Cyanoethylated diethanolamine | 0.15 | part |
| Potassium hydroxide | 0.10 | part |

The polymerization reaction was stopped by adding hydroxylamine in a proportion of 0.2 part per 100 parts of the monomers to the reaction system when the polymerization conversion reached 70%. Subsequenlty, the resulting latex was subjected to steam distillation with heating to remove unreacted monomers. Thereafter, an anti-aging agent (an alkylated phenol (hindered phenol)) was added thereto in a proportion of 1 part per 100 parts of the produced polymer. The latex was coagulated with an aqueous calcium chloride solution to form a cram. The resulting cram was washed with water and dried in a vacuum at 60° C. to obtain a sample. As a result of nitrogen analysis and analysis by infrared absorption spectrum, the composition of the produced polymer was butadiene/acrylonitrile/diethylaminoethyl methacrylate=53/40/7, and the Mooney viscosity $ML_{1+4}$ (100° C.) was 52.0. The infrared absorption spectrum of this polymer (polymer A) is shown in FIG. 1.

Polymerization was carried out by use of the same recipe as in the production of polymer A, except that the monomer composition was varied as shown in Table 1. The compositions and Mooney viscosities of the various polymers produced are summarized in Table 2. The infrared absorption spectra of polymers B to D were the same as that in FIG. 1.

TABLE 1

| Kind of polymer | BD[1] (parts) | AN[2] (parts) | DEMA[3] (parts) |
|---|---|---|---|
| B | 38 | 47 | 15 |
| C | 48 | 47 | 5 |
| D | 52 | 47 | 1 |
| E | 53 | 47 | 0 |

Note:
[1]Butadiene
[2]Acrylonitrile
[3]Diethylaminoethyl methacrylate

TABLE 2

| Kind of polymer | Composition (BD/AN/DEMA) (weight ratio) | Mooney viscosity $ML_{1+4}$ (100° C.) |
|---|---|---|
| B | 49/40/11 | 61.0 |
| C | 57.3/39/3.7 | 57.5 |
| D | 59.4/40/0.6 | 49.5 |
| E | 59/41/0 | 55.0 |

(Evaluation of Valcanizate)

The polymer obtained as mentioned above was kneaded with the compounding recipe mentioned below by means of a roll to form a sheet, which was then press-valcanized at 150° C. for 30 minutes to obtain a sheet having a thickness of 2 mm, which was provided for measurement of physical properties. The measurement of the physical properties was conducted according to the following methods:

| Compounding Recipe | |
|---|---|
| Polymer | 100 |
| FEF (fast extrusion furnace, a kind of carbon black) | 40 |
| ZnO | 5 |
| Stearic acid | 1 |
| DOP | 5 |
| S | 1.2 |
| TS (tetramethylthiuram monosulfide) | 0.4 |
| DM (dibenzothiazyl disulfide) | 1.0 |

Methods for measuring physical properties:

(I) Tensile test: JIS K 6301

(II) Hardness test: JIS K 6301 (JIS A-type)

(III) Gasoline resistance: JIS K 6301

A sample is immersed in a fuel oil (Fuel D) at 40° C. for 48 hours.

(IV) Parmanent compression set: JIS K 6301, 100° C.×22 hours (V) Low temperature test: JIS K 6301, Gehman torsional test (VI) Resistance to growth of crack by solvent: On a No. 1 dubbell specimen, index lines are drawn at intervals of 10 mm, and at the center of space between the index lines a crack of 2 mm is provided parallel to the index lines to thrust through the specimen to the back side. The specimen is then stretched so that the stretching ratio becomes 100%. The specimen in the stretched state is immersed in Fuel D at 40° C. and the time required till breaking is measured.

The results of the tests are summarized in Table 3. It is seen that when the DEMA content is increased, the resistance to growth of crack by solvent and resistance to swelling are greatly improved, and other physical properties of rubber are hardly affected. From these results, it is obvious that the copolymer of this invention is greatly effective for improving the resistance to growth of crack by solvent.

COMPARATIVE EXAMPLES 3 AND 3

Polymerization was conducted in the same manner as in the case of polymer A, except that dimethylaminoethyl methacrylate and dodecylaminoethyl methacrylate were substituted for the acrylate of this invention to produce polymers F and G, respectively. Each polymer was kneaded and vulcanized with the same recipe under the same conditions as in Example 3. Physical properties of the resulting vulcanizates were then evaluated in the same manner as in Example 1. The results are summarized in Table 4.

TABLE 4

| Kind of polymer | Example 3 A | Comparative Example 2 F | Comparative Example 3 G |
|---|---|---|---|
| Bound AN content (%) | 40 | 41 | 41 |
| Bound methacrylate content (%) | 7 | 7 | 7 |
| $ML_{1+4}$ (100° C.) | 52.0 | 50.0 | 57.0 |
| Physical properties in normal state | | | |
| $T_B$ (kgf/cm$^2$) | 215 | 223 | 214 |
| $E_B$ (%) | 600 | 620 | 580 |
| Hs (JIS-A) | 68 | 67 | 70 |
| Permanent compression set (%) 100° C. × 22 hrs | 24.0 | 31.0 | 25.0 |
| Immersion test (Fuel D, 40° C. × 48 hr) | | | |
| Sc ($T_B$) (%) | −38 | −35 | −39 |
| Sc ($E_B$) (%) | −36 | −34 | −40 |
| CH (Point) | −22 | −22 | −24 |
| ΔV (%) | +31 | +32 | +43 |
| Resistance to growth of crack by solvent (Fuel D 40° C., 100% stretching) | 210 | 206 | 71 |
| Gehman torsional test | | | |
| $T_{10}$ (°C.) | −13.0 | −13.0 | −13.5 |
| $T_{100}$ (°C.) | −18.0 | −17.5 | −19.0 |

Note: Sc ($T_B$), Sc ($E_B$), CH and ΔV have the same meanings as in Table 3.

From the results shown in Table 4, it is understood that when $R_1$ and $R_2$ of the (meth)acrylate represented by the general formula (I) are methyl groups, the permanent compression set is increased as shown in Comparative Example 2, and when the $R_1$ and $R_2$ are dodecyl groups, the resistance to growth of crack by solvent is not improved as shown in Comparative Example 3.

TABLE 3

| Kind of polymer | Comparative Example 1 E | Example 1 D | Example 2 C | Example 3 A | Example 4 B |
|---|---|---|---|---|---|
| Bound DEMA content (%) | 0 | 0.6 | 3.7 | 7.0 | 11.0 |
| Physical properties in normal state | | | | | |
| $T_B$ (kgf/cm$^2$) | 236 | 230 | 220 | 215 | 205 |
| $E_B$ (%) | 560 | 560 | 580 | 600 | 610 |
| Hs (JIS-A) | 69 | 70 | 69 | 68 | 68 |
| Permanent compression set (%) (100° C. × 22 hrs) | 22.0 | 22.0 | 23.0 | 24.0 | 25.0 |
| Immersion test (Fuel D, 40° C. × 48 hrs) | | | | | |
| Sc ($T_B$) (%) | −58 | −54 | −42 | −38 | −36 |
| Sc ($E_B$) (%) | −51 | −48 | −39 | −36 | −33 |
| CH (Point) | −24 | −22 | −22 | −22 | −22 |
| ΔV (%) | +46 | +40 | +35 | +31 | +30 |
| Resistance to growth of crack by solvent (Fuel D, 40° C., 100% stretching) | 65 | 102 | 150 | 210 | 230 |
| Gehman torsional test | | | | | |
| $T_{10}$ (°C.) | −14.5 | −14.0 | −13.5 | −13.0 | −12.0 |
| $T_{100}$ (°C.) | −19.0 | −19.0 | −18.5 | −18.0 | −17.0 |

Note:
Sc ($T_B$) refers to percentage of change in tensile strength at break after immersion.
Sc ($E_B$) refers to percentage of change in elongation at break after immersion.
CH refers to change of hardness after immersion.
ΔV refers to percentage of change of volume.

EXAMPLES 5 TO 10 AND COMPARATIVE EXAMPLES 4 AND 5

Various polymers having the compositions shown in Table 5 were produced by using diethylaminoethyl acrylate (Example 5), dibutylaminoethyl methacrylate (Example 6), dihexylaminoethyl methacrylate (Example 9) or dioctylaminoethyl methacrylate (Example 10) instead of the diethylaminoethyl methacrylate in Examples 1 to 4 and Comparative Example 1, or by using isoprene (Examples 7 and 8, Comparative Examples 4 and 5) instead of the butadiene in Examples 1 to 4 and Comparative Example 1, and subjected to the same procedure as in the cases of polymers A to E. Each polymer was kneaded and vulcanized with the same recipe under the same conditions as in Example 1. Physical properties of the resulting vulcanizates were then evaluated in the same manner as in Example 1. The results obtained are summarized in Table 5. The infrared absorption spectra of polymers H, I, J, K, N and O were substantially the same as that in FIG. 1.

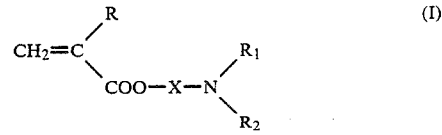

wherein R is H or $CH_3$, $R_1$ and $R_2$ are independently alkyl groups having 2 to 8 carbon atoms, and X is an alkylene group having 2 to 4 carbon atoms.

2. An amino group-containing diene copolymer according to claim 1, wherein the (meth)acrylate of the constituent (C) is selected from the group consisting of diethylaminoethyl acrylate, diethylaminoethyl methacrylate, dibutylaminoethyl methacrylate, dibutylaminopropyl methacrylate, diethylaminobutyl methacrylate, dihexylaminoethyl methacrylate and dioctylaminoethyl methacrylate.

3. An amino group-containing diene copolymer according to claim 1, wherein the constituent (C) is a methacrylate represented by the general formula (I) in which R is a methyl group and $R_1$ and $R_2$ are alkyl groups having 2 to 4 carbon atoms.

4. An amino group-containing diene copolymer according to claim 1, wherein the proportion of the constituent (A) is 50 to 80 weight percent.

5. An amino group-containing diene copolymer according to claim 1, wherein the proportion of the constituent (B) is 20 to 45 weight percent.

6. An amino group-containing diene copolymer according to claim 1, wherein the constituent (A) is butadiene.

TABLE 5

| Kind of polymer | Example 5 H | Example 6 I | Example 7 J | Example 8 K | Comparative Example 4 L | Comparative Example 5 M | Example 9 N | Example 10 O |
|---|---|---|---|---|---|---|---|---|
| Polymer composition | | | | | | | | |
| BD | 53 | 55 | — | — | — | — | 53 | 53 |
| AN | 40 | 39 | 31 | 25 | 32 | 25 | 40 | 41 |
| IP | — | — | 62 | 69 | 68 | 75 | — | — |
| DEMA | — | — | 7 | 6 | — | — | — | — |
| DEAA | 7 | — | — | — | — | — | — | — |
| DBMA | — | 6 | — | — | — | — | — | — |
| DHMA | — | — | — | — | — | — | 7 | — |
| DOMA | — | — | — | — | — | — | — | 6 |
| $ML_{1+4}$ (100° C.) | 58.5 | 62.0 | 70.0 | 98.0 | 76.0 | 110 | 53.5 | 48.0 |
| Physical properties in normal state | | | | | | | | |
| $T_B$ (kgf/cm$^2$) | 205 | 203 | 146 | 168 | 152 | 176 | 198 | 196 |
| $E_B$ (%) | 630 | 640 | 790 | 780 | 780 | 740 | 650 | 660 |
| Hs (JIS-A) | 66 | 68 | 60 | 67 | 61 | 66 | 21 | 20 |
| Permanent compression set (100° C. × 22 hrs) | 26 | 22 | 35 | 30 | 36 | 31 | 23 | 22 |
| Immersion test (Fuel D, 40° C. × 48 hrs) | | | | | | | | |
| Sc ($T_B$) (%) | −35 | −37 | −70 | −76 | −83 | −90 | −36 | −37 |
| Sc ($E_B$) (%) | −30 | −39 | −53 | −63 | −68 | −76 | −40 | −38 |
| CH (Point) | −21 | −24 | −29 | −31 | −32 | −34 | −25 | −27 |
| ΔV (%) | +30 | +35 | +45 | +52 | +57 | +68 | +37 | +38 |
| Resistance to growth of crack by solvent (sec) (Fuel D, 40° C., 100% stretching) | 218 | 178 | 53 | 24 | 10 | 2 | 172 | 163 |
| Gehman torsional test | | | | | | | | |
| $T_{10}$ (°C.) | −14.0 | −12.5 | −8.0 | −21.0 | −7.5 | −20.0 | −14 | −15 |
| $T_{100}$ (°C.) | −19.0 | −17.0 | −13.0 | −28.0 | −14.0 | −29.0 | −18 | −19.5 |

NOTE:
IP: Isoprene
DEMA: Diethylaminoethyl methacrylate
DEAA: Diethylaminoethyl acrylate
DBMA: Dibutylaminoethyl methacrylate
DHMA: Dihexylaminoethyl methacrylate
DOMA: Dioctylaminoethyl methacrylate
Sc ($T_B$), Sc ($E_B$), CH and ΔV have the same meanings as in Table 3.

We claim:

1. An amino-group containing diene copolymer comprising, as the monomer units constituting the copolymer, (A) 30 to 89.9 weight percent of butadiene, isoprene or both of them, (B) 10 to 50 weight percent of acrylonitrile and (C) 6 to 11 weight percent of a (meth)acrylate represented by the general formula (I):

7. An amino group-containing diene copolymer according to claim 2, wherein the constituent (A) is butadiene.

8. An amino group-containing diene copolymer according to claim 3, wherein the constituent (A) is butadiene.

9. An amino group-containing diene copolymer according to claim 6, wherein the constituent (C) is diethylaminoethyl methacrylate.

10. A method for producing an amino group-containing copolymer which comprises emulsion-polymerizing (A) butadiene, isoprene or both of them, (B) acrylonitrile and (C) a (meth)acrylate represented by the general formula (I):

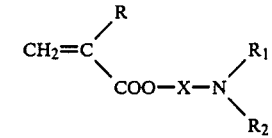

wherein R is H or $CH_3$, $R_1$ and $R_2$ are independently alkyl groups having 2 to 8 carbon atoms, and X is an alkylene group having 2 to 4 carbon atoms, in the presence of a polymerization initiator, an emulsifier and a molecular weight modifier at a temperature of 0° to 50° C., the proportions of (A), (B) and (C) being so selected that the copolymer contains 30 to 89.9 weight percent of monomer units (A), 10 to 50 weight percent of monomer units (B) and 6 to 11 weight percent of monomer units (C).

* * * * *